(12) United States Patent
Lee

(10) Patent No.: US 6,263,018 B1
(45) Date of Patent: Jul. 17, 2001

(54) APPARATUS FOR ADAPTIVE EQUALIZER

(75) Inventor: Sang-Moon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/227,864

(22) Filed: Jan. 11, 1999

(30) Foreign Application Priority Data

Jan. 12, 1998 (KR) .......................................... 98/600

(51) Int. Cl.⁷ .................................................... H03H 7/30

(52) U.S. Cl. .......................... 375/233; 375/350; 708/323

(58) Field of Search .................................. 375/229, 232, 375/233, 350; 708/322, 323

(56) References Cited

U.S. PATENT DOCUMENTS

| | | | |
|---|---|---|---|
| 6,021,161 | * | 2/2000 | Yamaguchi et al. ................. 375/232 |
| 6,084,907 | * | 7/2000 | Nagano et al. ...................... 375/320 |
| B1 6,178,201 | * | 1/2001 | Hillery ................................. 375/232 |

* cited by examiner

*Primary Examiner*—Amanda T. Le

(57) ABSTRACT

Provided with an apparatus for adaptive equalizer which has a first pulse slimming equalizing section and a third delaying and adding section, the apparatus including: an error signal extracting section for extracting an error from a signal delayed for a predetermined period of time at the third delaying and adding section; and a coefficient calculating and updating section for calculating the coefficients of the signal of the first pulse slimming equalizing section and the error signal extracted at the error signal extracting section, and updating the coefficients.

10 Claims, 5 Drawing Sheets

APPARATUS FOR ADAPTIVE EQUALIZER

BACKGROUND OF THE INVENTION

1. Field of the Invention

The present invention relates to an equalizer, and more particularly, to an apparatus for adaptive equalizer.

2. Description of Related Art

In general, equalizers play a rule to correct a distorted signal into a signal having a desired form while a data passes through a channel.

Hereinafter, an apparatus for adaptive equalizer according to prior art will be described with reference to the accompanying drawing.

FIG. 1 is a fundamental schematic of a magnetic recording system according to the background art, in which the system includes: a recording amplifier 1 for amplifying an input recorded data to a predetermined level; a tape 2 on which the data amplified at the recording amplifier is recorded; a reproducing amplifier 3 for reproducing the data recorded on the tape 2 and amplifying it to a predetermined level; an equalizing section 4 for outputting the waveform of a signal generated by compensating for distortion included in the signal amplified at the reproducing amplifier 3; and a detecting section 5 for detecting a data from the signal compensated for distortion at the equalizing section 4.

The equalizing section 4 includes a pulse slimming equalizer 4a for reducing interference between signals amplified at the reproducing amplifier 3, and a delay adder 4b for summing the output signal of the pulse slimming equalizer 4a and a signal generated by delaying the signal by time T.

The pulse slimming equalizer 4a is a cosine equalizer.

The operation of an apparatus for adaptive equalizer having the construction according to prior art will be described with reference to the accompanying drawing.

First, the recording amplifier 1 amplifies an input recorded data to a predetermined level and records it on the tape 2.

The reproducing amplifier 3 reproduces the data recorded on the tape 2 and amplifies it to a predetermined level.

Then equalizing section 4 compensates for distortion included in the signal amplified at the reproducing amplifier 3.

That means, the pulse slimming equalizer 4a in the equalizing section 4 reduces interference between isolated reproduced pulses amplified at the reproducing amplifier 3.

Then, the delaying adder 4b outputs the sum signal of the output signal of the pulse slimming equalizer 4a and the signal delayed by time T.

Accordingly, the detecting section 5 detects the original data from the distortion-compensated signal of the equalizing section 4.

Such an apparatus for adaptive equalizer according to prior art may maintain its performance as an equalizer with fixed parameters when a data is recorded and reproduced in the same system. If reproduction is performed in another system, however, it is impossible to perform an appropriate equalization and the performance may be deteriorated.

SUMMARY OF THE INVENTION

Accordingly, the present invention is directed to an is apparatus for adaptive equalizer that substantially obviates one or more of the limitations and disadvantages of the related art.

An object of the present invention is to provide an apparatus for adaptive equalizer which has its performance improved to satisfy the performance of a system for different channels and reduce the convergent time required for adaption.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an apparatus for adaptive equalizer which has a first pulse slimming equalizing section and a third delaying and adding section includes: an error signal extracting section for extracting an error from a signal delayed for a predetermined period of time at the third delaying and adding section; and a coefficient calculating and updating section for calculating the coefficients of the signal of the first pulse slimming equalizing section and the error signal extracted at the error signal extracting section, and updating the coefficients.

The signal k of the coefficient calculating and updating section is calculated with an equation given by:

$$k_{n+1} = k_n - \mu e_{n+1}(\gamma_n + \gamma_{n-2})$$

where $k_n$ is the initial value of the coefficient calculating and updating section, $\gamma_n + \gamma_{n-2}$ is the signal $U_n$ of the first pulse slimming equalizing section, $\mu$ is a step coefficient and $e_n$ is the signal of the error signal extracting section.

If times of $e_n$ and $\gamma_n + \gamma_{n-2}$ are not equal to input signals, the coefficient is calculated and updated with an equation given by:

$$k_{n+1} = k_n - \mu e_n(z\Lambda_n + \Lambda_{n-2})$$

where $k_n$ is the initial value of the coefficient calculating and updating section, $z\Lambda_n$ is the three-level quantized value of $z_n$ and $z\Lambda_{n-2}$ is the previous value of the three-level quantized value of $z\Lambda_n$.

In another aspect of the present invention, an apparatus for adaptive equalizer which has a second pulse slimming equalizing section and a fifth delaying and adding section includes: a reference signal generating section for bypassing a signal delayed for a predetermined period of time at the fifth delaying section, or processing the delayed signal to generate a reference signal; a second adding section for summing the signal bypassed at the reference signal generating section and the reference signal generated from the reference signal generating section; a fourth mixing section for mixing the sum signal of the second adding section and a step adjusting coefficient; a fifth mixing section for mixing the mixed signal of the fourth mixing section and the signal of the second pulse slimming equalizing section; and a first integrating section for integrating the mixed signal of the fifth mixing section.

The reference signal generating section includes: a first comparing section for bypassing the delayed signal of the fifth delaying and adding section, or comparing the delayed signal and an upper threshold; a first offset adjusting section for adjusting the signal of the first comparing section to the offset of a predetermined level; a second comparing section for comparing the delayed signal and a lower threshold; a second offset adjusting section for adjusting the signal of the second comparing section to the offset of a predetermined level; and a first adding section for summing the signals of the first and second offset adjusting sections.

In further another aspect of the present invention, an apparatus for adaptive equalizer which has a third pulse slimming equalizing section and a seventh delaying and adding section includes: an analog-to-digital converting section for converting a signal delayed for a predetermined period of time at the seventh delaying and adding section to a digital signal; a control signal generating section for processing the digital signal of the analog-to-digital converting section to generate a control signal; an eighth mixing section for mixing the control signal generated from the control signal generating section and a step adjusting coefficient; and a second integrating section for integrating the mixed signal of the eighth mixing section.

The control signal generating section includes: a three-level determining section for detecting the level of the digital signal of the analog-to-digital converting section and determining a three level signal; a third adding section for summing the digital signal of the analog-to-digital converting section and the three-level signal determined at the three-level determining section; an eighth delaying section for delaying the tree-level signal of the three-level determining section for a predetermined period of time; a ninth delaying section for delaying the delayed signal of the eighth delaying section again for a predetermined period of time; a fourth adding section for summing the signals of the three-level determining section and the ninth delaying section; and a seventh mixing section for mixing the signals of the third and fourth adding sections.

The seventh mixing section includes: a control section for outputting a control signal and a three-state signal based on the signals of the third and fourth adding sections; and a three-state buffer for outputting a three-state buffered signal based on the control signal and the three-state signal from the control section.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Figure 2:
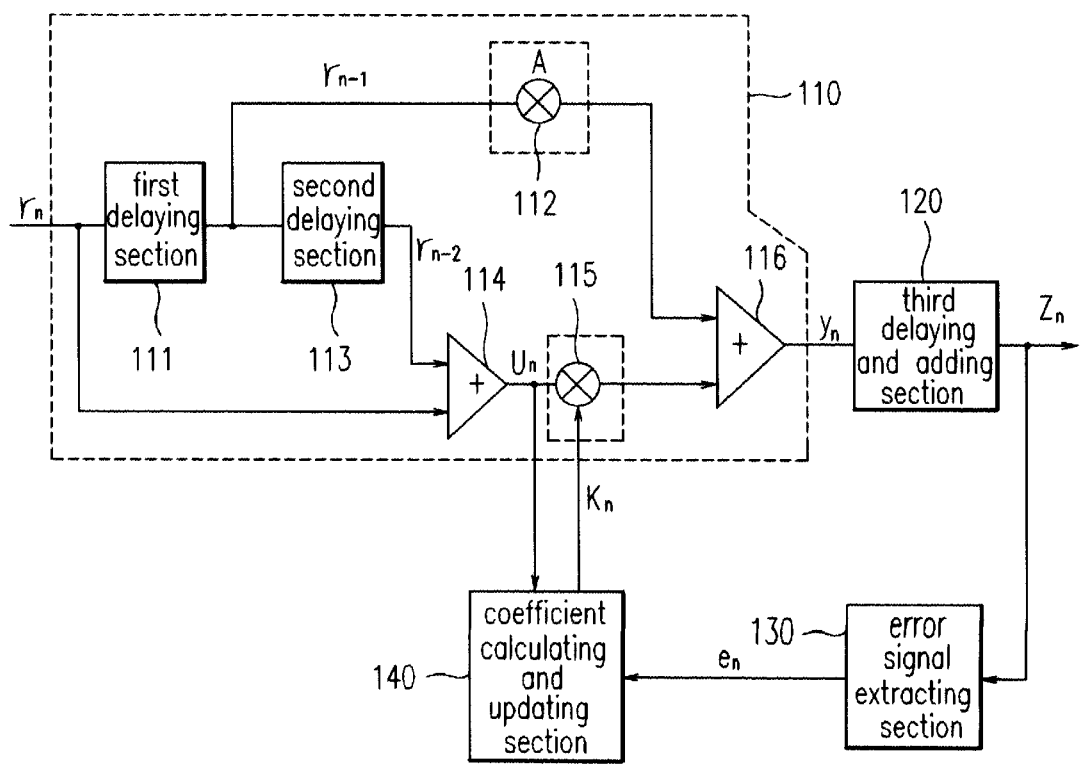
FIG. 2 is a schematic view showing the construction of an apparatus for adaptive equalizer according to the present invention.

FIG. 2 is a schematic view showing the construction of an apparatus for adaptive equalizer according to the present invention. As shown in FIG. 2, the apparatus for adaptive equalizer includes: a first pulse slimming equalizing section 110 for compensating for distortion included in a reproduced signal; a third delaying and adding section 120 for delaying the signal distortion-compensated at the first pulse slimming equalizing section 110; an error signal extracting section 130 for extracting an error from the signal distortion-compensated at the first pulse slimming equalizing section or the delayed signal of the third delaying and adding section; and a coefficient calculating and updating section 140 for calculating the coefficients of the signal of the first pulse slimming equalizing section 110 and the error signal extracted at the error signal extracting section 130 and updating them.

The first pulse slimming equalizing section 110 includes: a first delaying section 111 for delaying the reproduced signal for a predetermined period of time; a first mixing section 112 for multiplying the delayed signal of the first delaying section 111 by a predetermined gain A; a second delaying section 113 for delaying the delayed signal of the first delaying section 110 again for a predetermined period of time; a first adding section 114 for summing the reproduced signal and the delayed signal 2T of the second delaying section 113; a second mixing section 115 for mixing the signals of the first adding section 114 and the coefficient calculating and updating section 140; and a second adding section for summing the signal of the first and second mixing sections 112 and 115.

Figure 3:
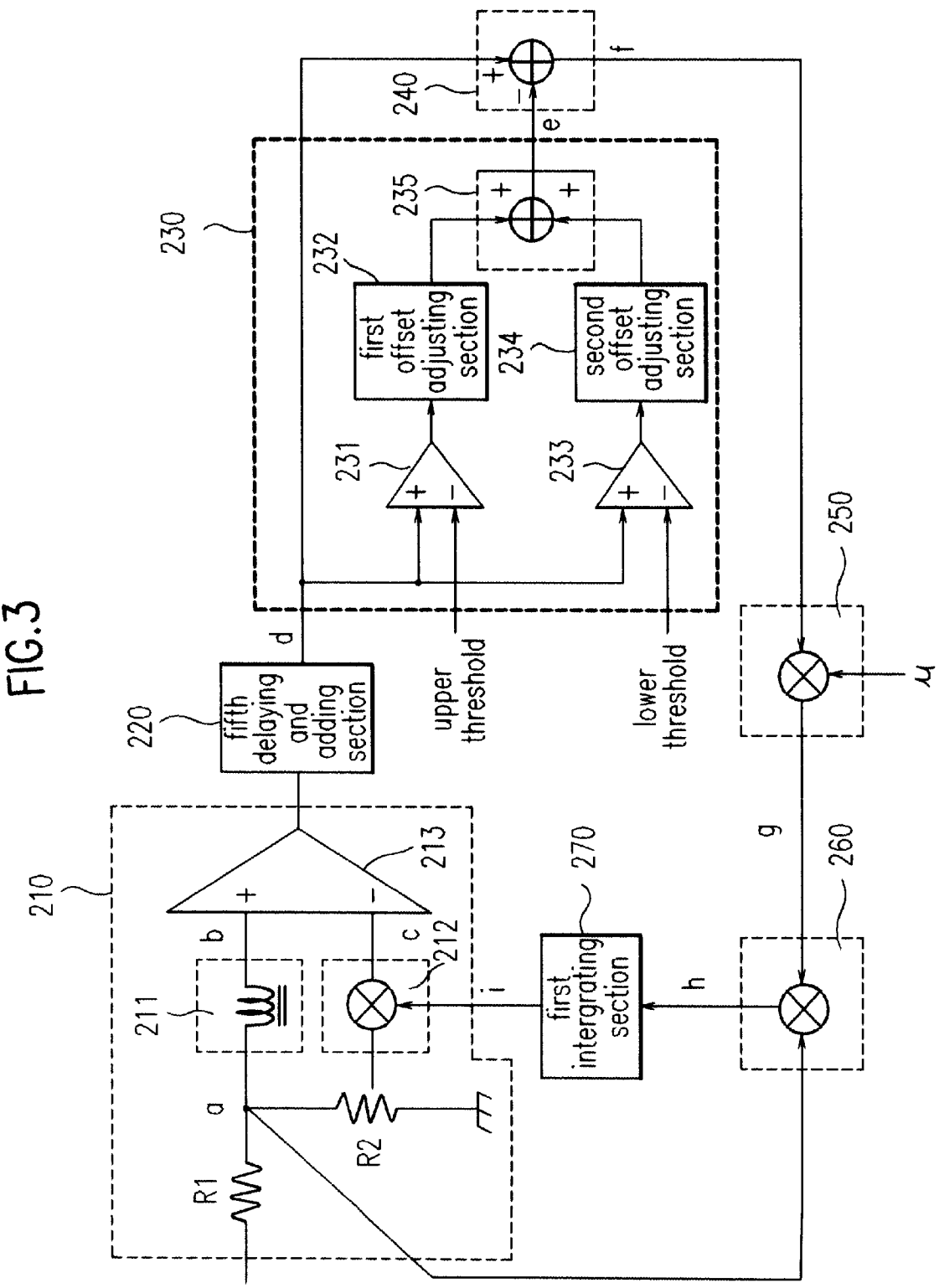
FIG. 3 is a schematic view showing a preferred embodiment of the apparatus for adaptive equalizer according to the present invention.

FIG. 3 is a schematic view showing a preferred embodiment of the apparatus for adaptive equalizer according to the present invention. Referring to FIG. 2, the apparatus for adaptive equalizer includes: a second pulse slimming equalizing section 210 for compensating for distortion included in a reproduced signal; a fifth delaying and adding section 220 for delaying the distortion-compensated signal of the first pulse slimming equalizing section 110 for a predetermined period of time; a reference signal generating section 230 for bypassing the signal delayed for a predetermined period of time at the fifth delaying section 220, or processing the delayed signal to generate a reference signal; a fourth adding section 240 for summing the signal bypassed at the reference signal generating section 230 and the reference signal generated from the reference signal generating section 230; a fourth mixing section for mixing the sum signal of the fourth adding section 240 and a step adjusting coefficient; a fifth mixing section 260 for mixing the mixed signal of the fourth mixing section 250 and the signal of the second pulse slimming equalizing section 210; and a first integrating section 270 for integrating the mixed signal of the fifth mixing section 260.

The second pulse slimming equalizing section 210 includes: a fourth delaying section 211 for delaying the reproduce signal for a predetermined period of time; a third mixing section 212 for mixing the reproduced signal and the signal of the second integrating section 270; and a first amplifying section for differentially amplifying the mixed signal of the third mixing section 212 and the delayed signal of the fourth delaying section 211.

The reference signal generating section 230 includes: a first comparing section 231 for bypassing the delayed signal of the fifth delaying and adding section 220, or comparing the delayed signal and an upper threshold; a first offset adjusting section 232 for adjusting the signal of the first comparing section 231 to the offset of a predetermined level;

a second comparing section 233 for comparing the delayed signal and a lower threshold; a second offset adjusting section 236 for adjusting the signal of the second comparing section 233 to the offset of a predetermined level; and a first adding section 235 for summing the signals of the first and second offset adjusting sections 232 and 234.

Figure 4:
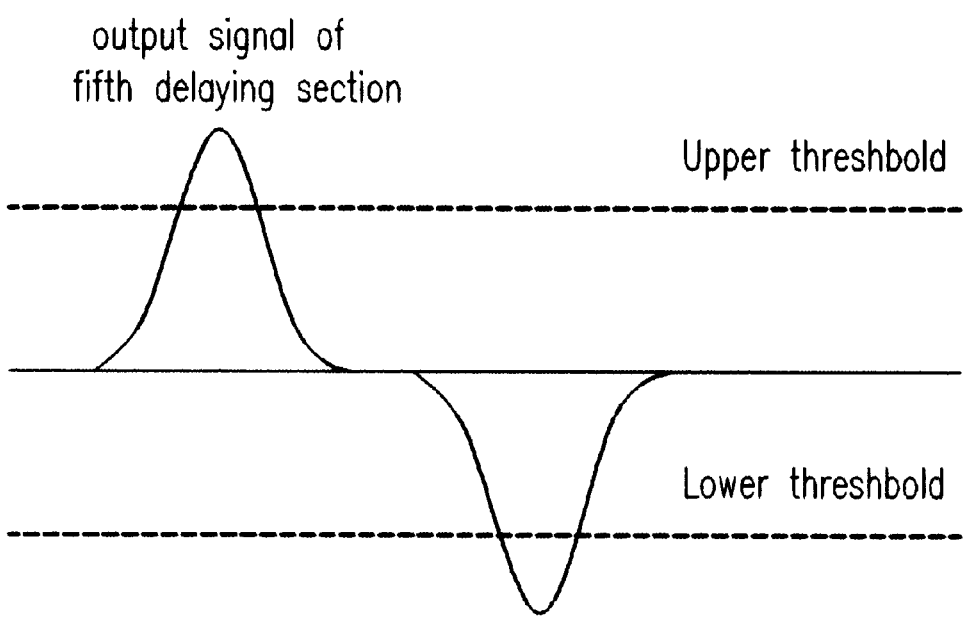
FIG. 4 is waveform diagrams showing the outputs of first and second comparing sections in a reference signal generating section shown in FIG. 3.
Figure 5:
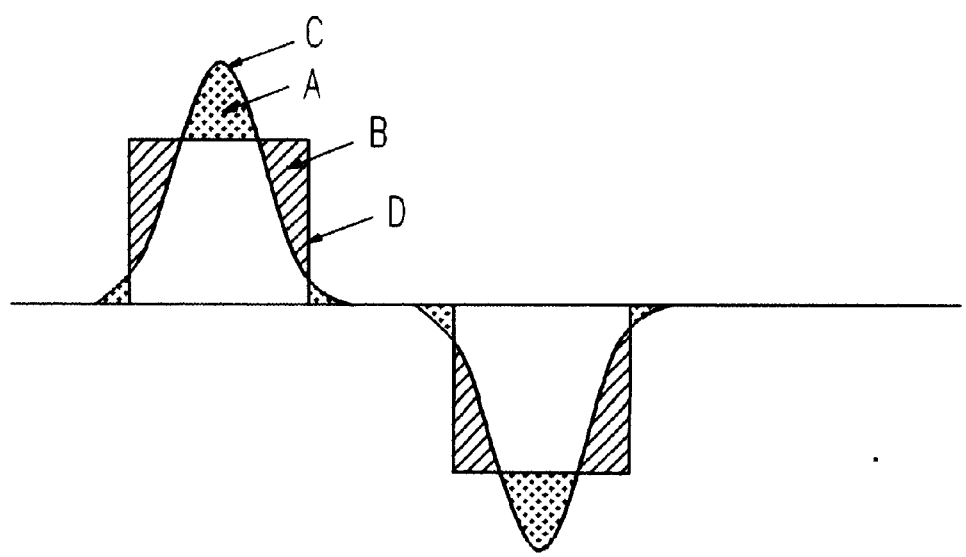
FIG. 5 is a waveform diagram showing the output of the reference signal generating section shown in FIG. 3.

FIG. 4 is a waveform diagram showing the outputs of the first and second comparing sections in the reference signal generating section shown in FIG. 3. FIG. 5 is a waveform diagram showing the output of the reference signal generating section shown in FIG. 3.

Figure 6:
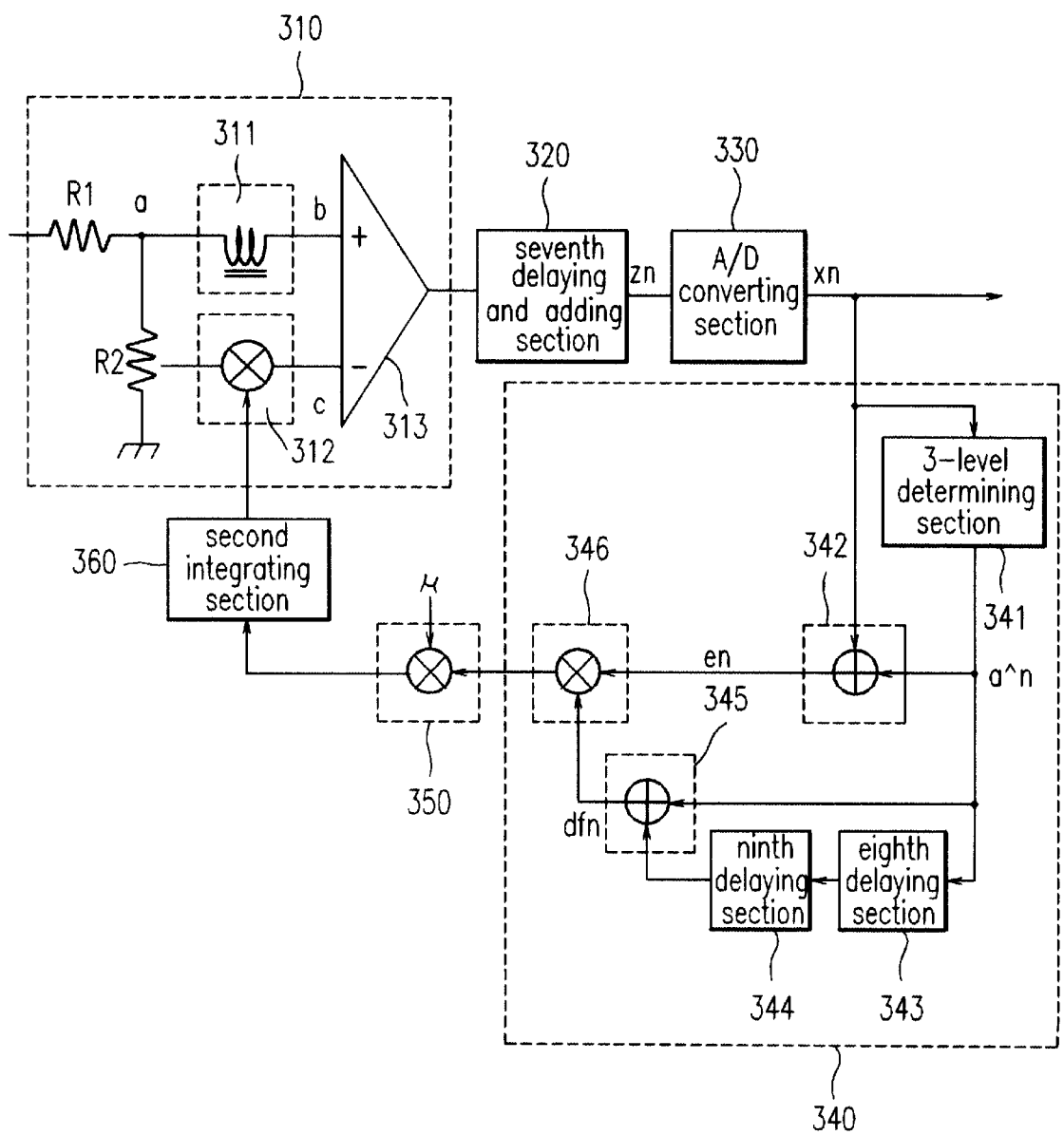
FIG. 6 is a schematic view showing another preferred embodiment of the apparatus for adaptive equalizer according to the present invention.

FIG. 6 is a schematic view showing another preferred embodiment of the apparatus for adaptive equalizer according to the present invention. As shown in FIG. 6, the apparatus for adaptive equalizer includes: a third pulse slimming equalizing section 310 for compensating for distortion included in a reproduced signal; a seventh delaying and adding section 320 for delaying the distortion-compensated signal of the third pulse slimming equalizing section 310 for a predetermined period of time; an analog-to-digital converting section 330 for converting a signal delayed for a predetermined period of time at the seventh delaying and adding section 320 to a digital signal; a control signal generating section 340 for processing the digital signal of the analog-to-digital converting section 330 to generate a control signal; an eighth mixing section 350 for mixing the control signal generated from the control signal generating section 340 and a step adjusting coefficient; and a second integrating section 260 for integrating the mixed signal of the eighth mixing section 350.

The third pulse slimming equalizing section 310 includes: a sixth delaying section 311 for delaying the reproduced signal for a predetermined period of time; a sixth mixing section 312 for mixing the reproduced signal and the signal of the second integrating section 360; and a first amplifying section 313 for differentially amplifying the mixed signal of the sixth mixing section 312 and the delayed signal of the second delaying section 211.

The control signal generating section 340 includes: a three-level determining section 341 for detecting the level of the digital signal of the analog-to-digital converting section 330 and determining a three level signal; a fifth adding section 342 for summing the digital signal of the analog-to-digital converting section 330 and the three-level signal determined at the three-level determining section 341; an eighth delaying section 343 for delaying the tree-level signal of the three-level determining section 341 for a predetermined period of time; a ninth delaying section 344 for delaying the delayed signal of the eighth delaying section 343 again for a predetermined period of time; a sixth adding section 345 for summing the signals of the three-level determining section 341 and the ninth delaying section 344; and a seventh mixing section 346 for mixing the signals of the third and fourth adding sections 342 and 345.

Figure 1:
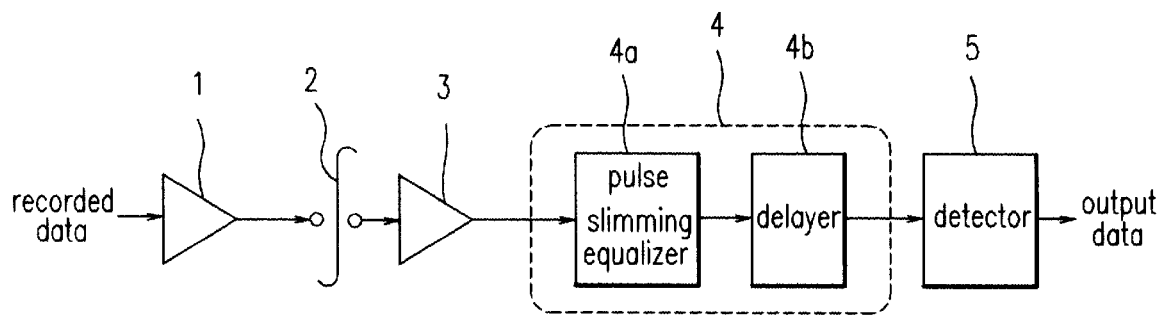
FIG. 1 is a schematic view showing the construction of the related art apparatus for adaptive equalizer.
Figure 7:
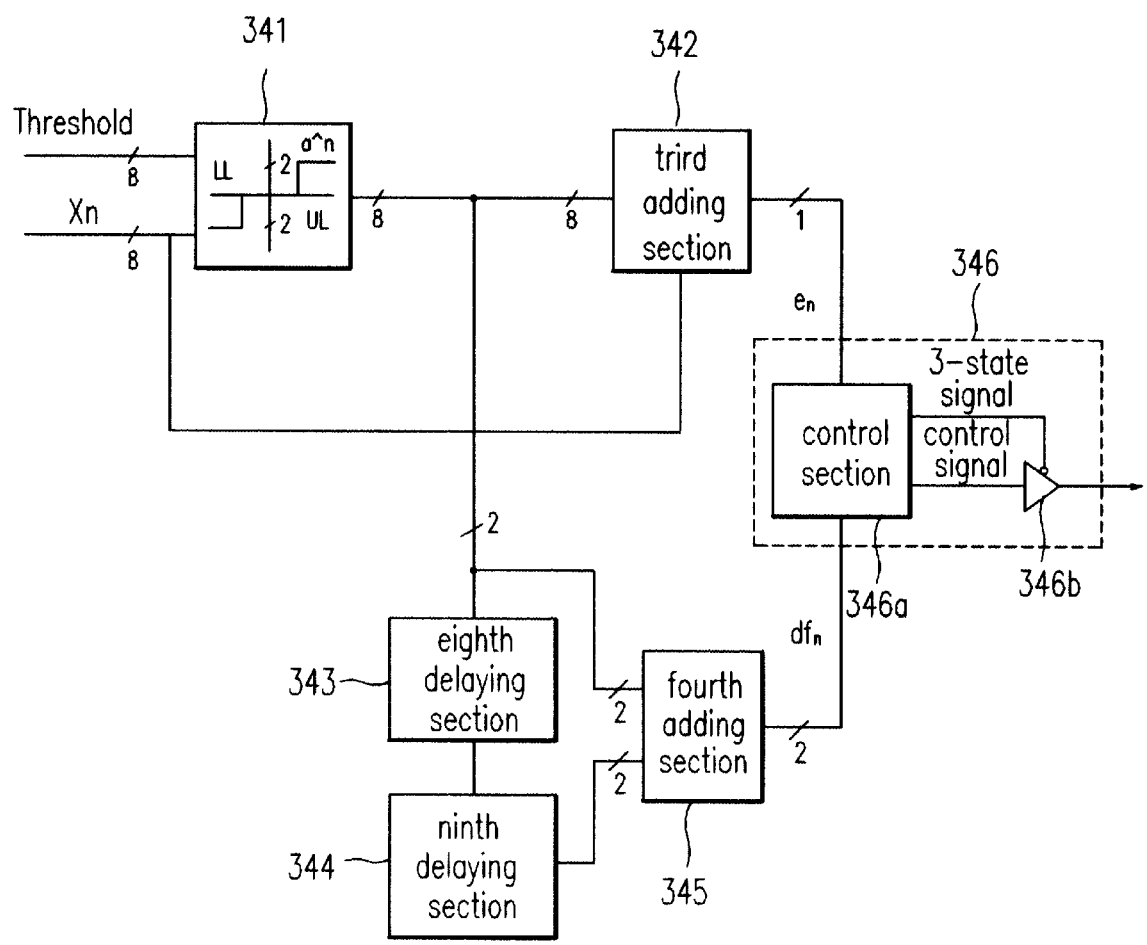
FIG. 7 is a schematic view showing another embodiment of a seventh mixing section shown in FIG. 6.

FIG. 7 is a schematic view of another embodiment of the seventh mixing section shown in FIG. 6. Referring to FIG. 1, the seventh mixing section 346 includes: a control section 346a for outputting a control signal and a three-state signal based on the signals of the third and fourth adding sections 342 and 345, and a three-state buffer 346b for outputting a three-state buffered signal based on the control signal and the three-state signal from the control section 346a.

The operation of the apparatus for adaptive equalizer according to the present invention will be described in detail with reference to FIG. 2.

First, the first pulse slimming equalizing section 110 compensates for distortion included in a reproduced signal $\gamma_n$ and outputs a compensated signal $y_n$.

That means, the first delaying section 111 in the first pulse slimming equalizing section 110 delays the reproduced signal $\gamma_n$. for a predetermined period of time to be output.

The first mixing section 112 multiplies the signal delayed at the first delaying section 111 by a predetermined gain A.

The second delaying section 113 delays the signal delayed at the first delaying section 110 again for a predetermined period of time, outputting a delayed signal $\gamma_n$.

The first adding section 114 sums the reproduced signal $\gamma_n$, and the signal $\gamma_{n-2}$ delayed at the second delaying section 113 and outputs the resulting signal $u_n$.

Accordingly, the second mixing section 115 mixes the signal $u_n$ of the first adding section 114 and a predetermined signal $k_n$ set at a coefficient calculating and updating section 140.

The second adding section 116 sums the signals of the first and second mixing sections 112 and 115 to output the resulting signal $y_n$.

The output signal $y_n$ of the second adding section 116 is calculated by Equation 1.

$$y_n = A\, \gamma_{n-1} + K(\gamma_n + \gamma_{n-2}) \qquad \text{[Equation 1]}$$

According to this, the third delaying and adding section 120 delays the distortion-compensated signal $y_n$ of the first pulse slimming equalizing section 110 for a predetermined period of time to be added, outputting the resulting signal $z_n$.

The output signal $z_n$ of the third delaying and adding section 120 is calculated by Equation 2.

$$z_n = y_n + y_{n-1} \qquad \text{[Equation 2]}$$

Then error signal extracting section 130 extracts an error signal from the output signal $z_n$ of the third delaying and adding section 120 and outputs the resulting signal $e_n$.

The output signal $e_n$ of the error signal extracting section 130 is calculated by Equation 3.

$$e_n = z_n - z\Lambda_n \qquad \text{[Equation 3]}$$

where $z\Lambda_n$ is defined by Equation 4.

$$z\Lambda_n = \begin{cases} 2 & 1 < z_n, \text{ or} \\ 0 & -1 < z_n < 1, \text{ or} \\ -2 & z_n < -1 \end{cases} \qquad \text{[Equation 4]}$$

After the initial state, error signal extracting section 130 extracts an error from the signal $Z_n$ of the third delaying section 120 and outputs the resulting signal $e_n$.

The coefficient calculating and updating section 140 calculates the coefficients of the signal $\gamma_n$ of the first pulse slimming equalizing section 110 and the error signal $e_n$ extracted at the error signal extracting section 130 and updates them, outputting the resulting signal $k_n$.

The process for calculating and updating the resulting signal k is performed with Equation 5 by the least mean square (LMS) algorithm.

$$k_{n+1} = k_n - \mu e_{n+1}(\gamma_n + \gamma_{n-1}) \qquad \text{[Equation 5]}$$

where $k_n$ is the initial value of the coefficient calculating and updating section 140, $\gamma_n + \gamma_{n-2}$ is the signal $U_n$ of the first pulse slimming equalizing section 110, $\mu$ is a stop coefficient and $e_n$ is the signal of the error signal extracting section.

When multiplying $e_n$ by ($y_n 30 \; y_{n+2}$) in Equation 5, the times of $e_n$ and ($y_n + y_{n+2}$) must be equal to each other with respect to input signals.

Otherwise, this algorithm doesn't work.

Actually, there is a serious problem in realizing the algorithm in analog.

To overcome this problem, another algorithm such as Equation 6 is proposed.

$$k_{n+1} = k_n - \mu e_n (z\Lambda_n + z\Lambda_{n-2}) \qquad \text{[Equation 6]}$$

where $k_n$ is the initial value of the coefficient calculating and updating section 140, $\mu$ is the step coefficient, $e_n$ is the signal of the error signal extracting section, $z\Lambda_n$ is the three-level quantized value of $z_n$ and $z\Lambda_{n-2}$ is the previous value of the three-level quantized value of $z_n$.

This enables the present invention apparatus to be excellent in the aspect of convergent velocity and mean square error (MSE) performance.

Further another embodiment of the apparatus for adaptive equalizer according to the present invention will be described in detail with reference to FIG. 3.

First, the second pulse slimming equalizing section 210 compensates for distortion included in a reproduced signal and outputs the resulting signal.

That means, the fourth delaying section 211 in the second pulse slimming equalizing section 210 delays the reproduced signal "a" according to the division voltage of resistance RI and variable resistance R2 for a predetermined period of time, outputting a delayed signal "b".

The third mixing section 212 mixes the signal varied from the reproduced signal "a" through the variable resistance R2 and the signal "i" of the first integrating section 270 and outputs the resulting signal "c". Accordingly, the first amplifying section 213 differentially amplifies the mixed signal "c" of the third mixing section 212 and the delayed signal "b" of the fourth delaying section 211.

Then, the fifth delaying and adding section 220 delays the signal distortion-compensated at the first pulse slimming equalizing section 110 for a predetermined period of time and outputs the resulting signal "d" shown in FIG. 5.

Thus the reference signal generating section 2309 bypasses the delayed signal "d" of the fifth delaying and adding section 220.

Besides, the reference signal generating section 230 processes the delayed signal "d" to generate a reference signal "e" shown in FIG. 5.

That means, the first comparing section 231 in the reference signal generating section 230 compares the delayed signal "d" of the fifth delaying and adding section 220 and the upper threshold, as shown in FIG. 4, and outputs the resulting signal.

Subsequently, the first offset adjusting section 232 adjusts the signal of the first comparing section 231 to the offset of a predetermined level.

That means, the first offset adjusting section 232 adjusts the low level of the signal from the first comparing section 231 to "zero".

In addition, the second comparing section 233 compares the delayed signal "d" and the lower threshold, as shown in FIG. 4, and outputs the resulting signal.

Subsequently, the second offset adjusting section 236 adjusts the signal of the second comparing section 233 to the offset of a predetermined level.

That means, the second offset adjusting section 236 adjusts the high level of the signal from the second comparing section 233 to "zero".

A first adding section 235 sums the signals of the first and second offset adjusting sections 232 and 236 and outputs the resulting signal.

Accordingly, the second adding section 240 sums the bypassed signal "d" of the reference signal generating section 230 and the reference signal "e" generated at the reference signal generating section 230, outputting the resulting signal "f".

The output signal "f" of the second adding section 240 is C-D as shown in FIG. 5.

Without errors, the area of the region indicated by "A" must be equal to that of the region indicated by "B".

A fourth mixing section 250 mixes the sum signal "f" of the second adding section 240 and the step adjusted coefficient $\mu$ and outputs the resulting signal "g".

The fifth mixing section 260 then mixes the mixed signal "g" of the fourth mixing section 250 and the signal at point 'a' of the second slimming equalizing section 210 and outputs the resulting signal "h".

Accordingly, the first integrating section 270 integrates the mixed signal "h" of the fifth mixing section 260 and controls the size of signal "i" at point 'c' of the first amplifying section 213 in the second pulse slimming equalizing section 210.

Still further another embodiment of the apparatus for adaptive equalizer according to the present invention wilt be described in detail with reference to FIG. 6.

First, the third pulse slimming equalizing section 310 compensates for distortion included in a reproduced signal and outputs the resulting signal.

That means, the sixth delaying section 311 in the third pulse slimming equalizing section 310 delays the reproduced signal "a" according to the division voltage of resistance R1 and variable resistance P2 for a predetermined period of time, outputting a delayed signal "b".

The sixth mixing section 312 mixes the signal varied from the reproduced signal "a" through the variable resistance R2 and the signal of the second integrating section 360 and outputs the resulting signal "c".

Accordingly, the first amplifying section 313 differentially amplifies the mixed signal "c" of the sixth mixing section 312 and the delayed signal "b" of the sixth delaying section 311.

Then the seventh delaying and adding section 320 delays the signal distortion-compensated at the third pulse slimming equalizing section 310 for a predetermined period of time and outputs the resulting signal "zn".

Accordingly, the analog-to-digital converting section 330 converts the delayed signal "zn" of the seventh adding section 320 to a digital signal and outputs the resulting signal "xn".

The control signal generating section 340 processes the digital signal "xn" to generate a control signal.

That means, the three-level determining section 341 in the control signal generating section 340 detects the level of the digital signal "xn" of the analog-to-digital converting section 330 to determine a three-level quantized value and outputs the resulting signal "a^n".

If the output signal "xn" of the analog-to-digital converting section 330 is 8 bits, the three-level determining section 341 defines 2, 0 and −2 as follows:

2: 1101 0101

0: 1000 0000

−2: 0010 1010

The upper and lower limits and zero which are thresholds to obtain a three-level value are defined as follows:

Upper Limit: 1010 1010

Zero: 1000 0000

Lower Limit: 0101 0101

Accordingly, the three-level determining section 241 applies the threshold to the output signal "xn" of the analog-to-digital converting section 330 and determines the three-level value as follows:

xn>UL: 2
LL≦xn≦UL: 0
zn<LL: −2

The output data determined at the three-level determining section 341 is a reference signal and output to a third adding section 342.

The third adding section 342 sums the digital signal "xn" of the analog-to-digital converting section 330 and the three-level signal "a^n" determined at the three-level determining section 341 and outputs the resulting signal "en"

The eighth delaying section 343 delays the three-level signal "a^n" determined at the three-level determining section 341 for a predetermined period of time.

Subsequently, the ninth delaying section 344 delays the delayed signal of the eighth delaying section 343 again for a predetermined period of time.

Then the fourth adding section 345 sums the signal "a^n" of the three-level determining section 341 and the signal of the ninth delaying section 344 and outputs the resulting signal "dfn".

The true table used to obtain the resulting signal "dfn" of the fourth adding section 345 is shown in Table 1.

Accordingly, the seventh mixing section 346 mixes the signal "a^n" of the third adding section 342 and the signal "dfn" of the fourth adding section 345 to output the resulting signal.

TABLE 1

| OUTPUT OF THREE-LEVEL DETERMINING SECTION | OUTPUT OF NINTH DELAYING SECTION | OUTPUT OF FOURTH ADDING SECTION |
|---|---|---|
| 11 | 11 | 11 |
| 11 | 00 | 10 |
| 11 | 10 | 11 |
| 10 | 11 | 11 |
| 00 | 11 | 10 |
| 00 | 00 | 00 |
| 10 | 10 | 10 |
| 00 | 10 | 00 |
| 10 | 00 | 00 |

The true table to obtain the resulting signal of the seventh mixing section 346 is shown in Table 2.

TABLE 2

| dfn | en | out |
|---|---|---|
| 11 | 1 | 11 |
| 10 | 1 | 10 |
| 00 | 1 | 00 |
| 11 | 0 | 00 |
| 10 | 0 | 10 |
| 00 | 0 | 11 |

As shown in FIG. 7, the control section 346a operates the signal "a^n" of the third adding section 342 and the signal "dfn" of the fourth adding section 345. If the result is "11", "10" or "00", the control section 346a determines the output signal as +1, 0 or −1, respectively.

The output +1 means that an error "en" occurs in the positive direction, the output 0 meaning no error and the output −1 meaning that an error occurs in the negative direction.

Besides, the control section 346a outputs a control signal and a three-state enable signal corresponding to the type of three outputs, such as, +1, 0 or −1.

A three-state buffer 346b outputs a signal based on the signal of the control section 346a.

That means, if the signal of the control section 346a is "11", the three-state buffer 346b outputs an enable signal for the three-state enable signal and a HIGH signal for the HIGH (+) control signal. If the signal of the control section 346a is "10" and the three-state enable signal is disable, the three-state buffer 346b outputs a high impedance irrespective of the control signal.

When the signal of the control section 346a is "00", the three-state buffer 346b outputs an enable signal for the three-state enable signal and a LOW signal for the LOW (−1) control signal.

An eighth mixing section 350 mixes the control signal generated from the control signal generating section 340 and the step adjusting coefficient $\mu$ and outputs the resulting signal.

The process for mixing the step adjusting coefficient $\mu$ at the eighth mixing section 350 is enabled with an attenuator using resistances.

Accordingly, the second integrating section 360 integrates the mixed signal of the eighth mixing section 350 and controls the size of a signal at point 'c' of the first amplifying section 313 in the third pulse slimming equalizing section 310.

Such as in the present invention described above, it is possible to prevent deterioration of performance by satisfying the performance of a system for different channels and reducing convergent time required for adaption of the system.

It will be apparent to those skilled in the art that various modifications and variations can be made in the present invention without deviating from the spirit or scope of the invention. Thus, it is intended that the present invention covers the modifications and variations of this invention provided they come within the scope of the appended claims and their equivalents.

What is claimed is:

1. An apparatus for adaptive equalizer, which has a first pulse slimming equalizing section and a third delaying and adding section, the apparatus comprising:

error signal extracting means for extracting an error from a signal delayed for a predetermined period of time at the third delaying and adding section; and coefficient calculating and updating means for calculating the coefficients of the signal of the first pulse slimming equalizing section and the error signal extracted at the error signal extracting means, and updating the coefficients.

2. The apparatus as claimed in claim 1, wherein a signal $e_n$ output from the error signal extracting means is calculated with an equation given by:

$$e_n = z_n - z\Lambda_n$$

where $z_n$ is the signal of the third delaying section and $z\Lambda_n$ is the three-level quantized value of $z_n$.

3. The apparatus as claimed in claim 2, wherein $z\Lambda_n$ is calculated with an equation given by:

$$z\Lambda_n = \quad 2 \quad 1 < z_n, \text{ or}$$

-continued $$0 \quad -1 < z_n < 1, \text{ or}$$
$$-2 \quad z_n < -1.$$

4. The apparatus as claimed in claim 1, wherein the signal k of the coefficient calculating and updating means is calculated with an equation given by:

$$k_{n+1} = k_n - \mu e_{n+1}(\gamma_n + \gamma_{n-2})$$

where $k_n$ is the initial value of the coefficient calculating and updating means, $\gamma_n + \gamma_{n-2}$ is the signal $U_n$ of the first pulse slimming equalizing section, $\mu$ is a step coefficient and $e_n$ is the signal of the error signal extracting means.

5. The apparatus as claimed in claim 4, wherein if times of $e_n$ and $\gamma_n + \gamma_{n-2}$ are not equal to input signals, the coefficient is calculated and updated with an equation given by:

$$k_{n-1} - k_n = \mu e_n(z\Lambda_n + z\Lambda_{n-2})$$

where $k_n$ is the initial value of the coefficient calculating and updating means, $z\Lambda_n$ is the three-level quantized value of $z_n$ and $z\Lambda_{n-2}$ is the previous value of the three-level quantized value of $z\Lambda_n$.

6. An apparatus for adaptive equalizer, which has a second pulse slimming equalizing section and a fifth delaying and adding section, the apparatus comprising:

reference signal generating means for bypassing a signal delayed for a predetermined period of time at the fifth delaying section, or processing the delayed signal to generate a reference signal;

second adding means for summing the signal bypassed at the reference signal generating means and the reference signal generated from the reference signal generating means;

fourth mixing means for mixing the sum signal of the second adding means and a step adjusting coefficient;

fifth mixing means for mixing the mixed signal of the fourth mixing means and the signal of the second pulse slimming equalizing section; and first integrating means for integrating the mixed signal of the fifth mixing means.

7. The apparatus as claimed in claim 6, wherein the reference signal generating means comprises:

a first comparing section for bypassing the delayed signal of the fifth delaying and adding section, or comparing the delayed signal and an upper threshold;

a first offset adjusting section for adjusting the signal of the first comparing section to the offset of a predetermined level;

a second comparing section for comparing the delayed signal and a lower threshold;

a second offset adjusting section for adjusting the signal of the second comparing section to the offset of a predetermined level; and a first adding section for summing the signals of the first and second offset adjusting sections.

8. An apparatus for adaptive equalizer, which has a third pulse slimming equalizing section and a seventh delaying and adding section, the apparatus comprising:

analog-to-digital converting means for converting a signal delayed for a predetermined period of time at the seventh delaying and adding section to a digital signal;

control signal generating means for processing the digital signal of the analog-to-digital converting means to generate a control signal;

eighth mixing means for mixing the control signal generated from the control signal generating means and a step adjusting coefficient; and second integrating means for integrating the mixed signal of the eighth mixing means.

9. The apparatus as claimed in claim 8, wherein the control signal generating means comprises:

a three-level determining section for detecting the level of the digital signal of the analog-to-digital converting means and determining a three level signal;

a third adding section for summing the digital signal of the analog-to-digital converting means and the three-level signal determined at the three-level determining section;

an eighth delaying section for delaying the tree-level signal of the three-level determining means for a predetermined period of time;

a ninth delaying section or delaying the delayed signal of the eighth delaying section again for a predetermined period of time;

a fourth adding section for summing the signals of the three-level determining section and the ninth delaying section; and a seventh mixing section for mixing the signals of the third and fourth adding sections.

10. The apparatus as claimed in claim 9, wherein the seventh mixing section comprises:

a control section for outputting a control signal and a three-state signal based on the signals of the third and fourth adding sections; and a three-state buffer for outputting a three-state buffered signal based on the control signal and the three-state signal from the control section.

* * * * *